A. B. MOE.
DRINKING FOUNTAIN.
APPLICATION FILED MAY 1, 1911.
997,313.
Patented July 11, 1911.
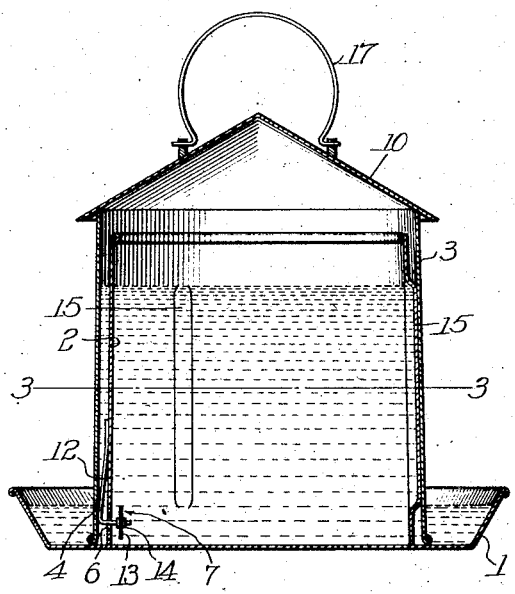
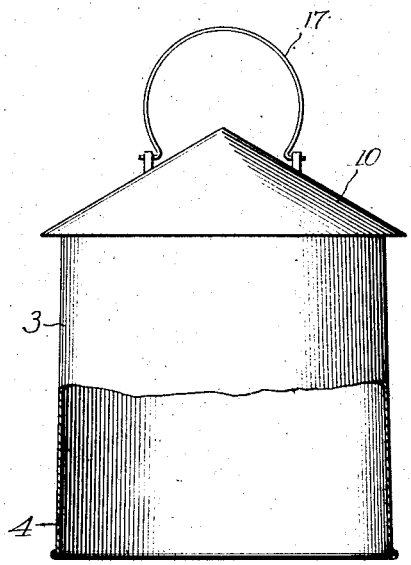
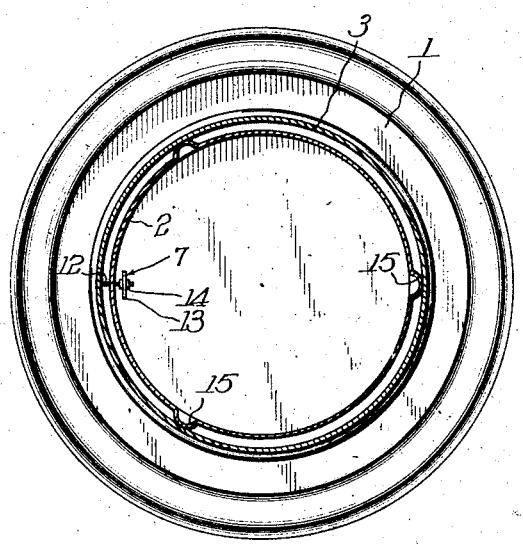
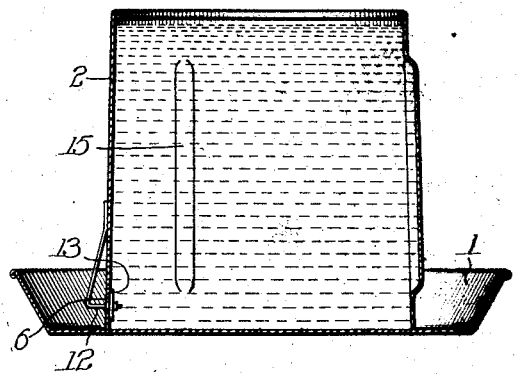
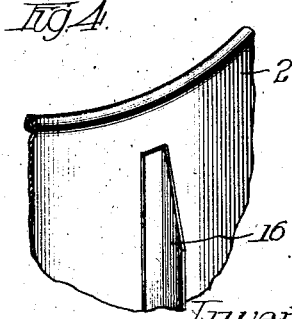

UNITED STATES PATENT OFFICE.

AARON B. MOE, OF MAYWOOD, ILLINOIS.

DRINKING-FOUNTAIN.

997,313.   Specification of Letters Patent.   Patented July 11, 1911.

Application filed May 1, 1911. Serial No. 624,304.

*To all whom it may concern:*

Be it known that I, AARON B. MOE, a citizen of the United States, residing at 1501 South Second avenue, village of Maywood, county of Cook, and State of Illinois, have invented new and useful Improvements in Drinking-Fountains, of which the following is a specification.

This invention relates to barometric watering fountains for poultry or small animals, or fountains of that class in which a supply of water is contained in a reservoir or tank from which it flows into a shallow dish or trough; being maintained in the latter at a predetermined level and prevented from overflowing the same by atmospheric pressure.

One of the objects of the present invention is to provide a device of the sort above described which may be manufactured at small cost and which shall be simple and efficient in its operation.

A form of device embodying the principles of the present invention is illustrated in the accompanying drawings in which:

Figure 1 is a vertical section through the device. Fig. 2 is a view partly in elevation and partly in vertical section, showing the device with its cover removed. Fig. 3 is a horizontal section on the line 3—3 of Fig. 1. Fig. 4 is a fragmentary view, in perspective, of a portion of the wall of the inner tank or reservoir, showing a modified form of construction.

As shown in said drawings, the device comprises a shallow dish or trough 1 in which the water is maintained at approximately the level indicated; a tank or reservoir 2 for supplying water to said dish; and a removable cover 3, closed at its upper end and adapted to fit over the reservoir 2 and extend downward into the water in the dish 1 and rest upon the bottom of the same. Said cover 3 is provided near its lower edge with an opening 4 through which the water is supplied to the dish 1. The tank 2 is also provided with an opening 6 near its bottom for the escape of water into the cover 3 when the latter is placed in position over said reservoir, and said opening 6 is closed by a valve 7 during the time when the cover 3 is removed for the purpose of filling said reservoir; being again opened when said cover is replaced by the engagement of said cover with said valve. Referring now in more detail to these parts, said dish 1 is here shown as made of sheet metal and is circular in form. Rising from its interior is an approximately cylindrical tank or reservoir 2 open at the top and likewise made of sheet metal. Said tank or reservoir 2 is rolled inward at its top as indicated, in order to add strength thereto and facilitate the placing of the cover 3 over it; and for the latter purpose also, said tank 2 is not exactly cylindric, but is made of slightly decreasing diameter from its bottom to its top. The cover 3 is correspondingly tapered, whereby its larger bottom wall may be easily and quickly placed over the smaller top wall of said tank 2.

The cover 3 is similar in its shape to the tank 2, being of slightly larger dimensions in order to fit over the latter as shown. Its bottom edge is rolled outward for the purpose of facilitating its placing in position, and also for a further purpose which will appear hereinafter. Its upper end is closed by an air tight top 10, the latter being preferably made conical in shape in order to prevent poultry from roosting upon it. The opening 4 is placed at such height from the bottom edge as may be determined upon for the depth of the water in the dish 1; allowance being made for the fact that the water will rise in the dish a very small distance above the top edge of said opening; due to the expansion of the air in the upper part of the cover 3 which is relieved of such external pressure as is required to support the depth of water in said cover 3. Allowance must also be made for the fact that a small quantity of water contained in the annular space between the reservoir and its cover will run down into the dish 1 when the cover 3 is removed for the purpose of filling said reservoir.

The valve 7 comprises a bent valve arm 12, preferably made of spring wire, attached at one end to the wall of the tank 2, and extending downward and through the opening 6 into the tank, being provided with a valve disk 13 upon its inner end. Said valve disk 13 may be made of leather or other suitable material and may be attached to said wire by means of small metal disks or washers 14, as indicated, the latter being secured to said wire by soldering or in other convenient manner. In Fig. 1 is shown the manner in which the cover 3, upon being placed over the tank 2, engages with said valve to open the same; it being evident that when said cover is slid downward into place, its lower edge will engage with the wire valve arm 12 and press the same inward to open said valve. The outward rolling of the lower edge of said cover, as above described, will facilitate such engagement and prevent the cover from cutting into the wire.

In order to maintain the tank and its cover in axial alinement, so that the valve 7 will always be opened the required distance by the placing of the cover 3 in position, means are provided for spacing the walls of said tank and its cover the same distance apart all around their circumferences; said means, as shown in Figs. 1 to 3 inclusive, taking the form of vertical corrugations 15 in the wall of said tank. As a modification of this construction however, in Fig. 4 is shown a radially extending flange or rib 16, of which three or more may be secured to the outer wall of said tank; each rib comprising a piece of sheet metal bent into angular form and secured to said wall by soldering or otherwise. The upper part of each flange or rib is made wedge-shaped, as shown, in order to facilitate the placing of the cover 3 over it. A handle 17 of any convenient form may be attached to the conical top of the cover 3 to permit of its being easily removed and replaced upon the tank 2 as above described.

In the operation of the device, the cover 3 is removed and water is poured into the tank 2, from which it is prevented from escaping by the valve 7. The cover 3 is then replaced, whereupon the valve 7 is opened and the water escapes into the cover 3 and through the opening 4 into the dish 1, rising in the same to substantially the height of the top edge of said opening 4; at which level it is maintained as water is consumed from said dish, by replenishment from the supply in said cover 3.

As the valve 7 is in operation only temporarily during the brief period when the cover 3 is removed and the tank 2 being filled, it is evident that the efficiency of the device will not be materially impaired even if said valve should leak quite considerably; and therefore it is not necessary that great care be taken in its construction, but the same may be quite simply and cheaply constructed, in the form above described, or in some equivalent form.

I claim as my invention:

1. In a fountain, the combination of a trough, a reservoir having an opening communicating therewith, a valve controlling said opening, a cover for said reservoir adapted to extend into said trough, and means for operating said valve through the movement of said cover.

2. In a fountain, the combination of a trough, a supply reservoir having an opening communicating therewith, a valve controlling said opening, and a removable cover for said supply reservoir, extending into said trough, and adapted to engage with said valve.

3. In a fountain, the combination of a trough, a supply reservoir having an opening communicating therewith, a valve controlling said opening, a removable cover for said reservoir, closed at its upper end and adapted to extend into said trough, and means for operating said valve through the movement of said cover.

4. In a fountain, the combination of a trough, a supply reservoir having an opening communicating therewith, a valve controlling said opening, and a removable cover for said supply reservoir, said cover extending into said trough and being closed at its upper end, and adapted to engage with said valve.

5. In a fountain, the combination of a trough, a supply reservoir having an opening communicating therewith, a valve controlling said opening, and a removable cover for said supply reservoir, said cover extending into said trough and being closed at its upper end, and adapted to engage with said valve, and spacing members for maintaining said reservoir and its cover in axial alinement.

In witness whereof, I have hereunto subscribed my name in the presence of two witnesses this 27th day of April 1911.

AARON B. MOE.

Witnesses:
  MARK E. OTIS,
  L. CHRISTIANSON.